United States Patent [19]

Jayaraman et al.

[11] Patent Number: 5,287,267
[45] Date of Patent: Feb. 15, 1994

[54] METHODS FOR PARTS PROCUREMENT QUANTITY DETERMINATION WHERE DEMAND IS UNCERTAIN FOR THE PRODUCT IN WHICH THE PARTS ARE USED

[75] Inventors: Rangarajan Jayaraman, Hopewell Junction; Robin Roundy, Ithaca; Ramesh Srinivasan, Yorktown Heights, all of N.Y.

[73] Assignee: International Business Machines Corporation, Armonk, N.Y.

[21] Appl. No.: 698,632

[22] Filed: May 10, 1991

[51] Int. Cl.$^5$ .............................. G06F 15/24
[52] U.S. Cl. .................. 364/403; 364/401
[58] Field of Search .......... 364/400, 401, 402, 403, 364/468, 149, 152, 143

[56] References Cited

U.S. PATENT DOCUMENTS

| | | | |
|---|---|---|---|
| 4,459,663 | 7/1984 | Dye | 364/403 |
| 4,646,238 | 2/1987 | Carlson, Jr. et al. | 364/403 |
| 4,887,206 | 12/1989 | Natarajan | 364/401 |
| 4,887,207 | 12/1989 | Natarajan | 364/468 |
| 4,920,488 | 4/1990 | Filley | 364/403 |
| 4,924,385 | 5/1990 | Dote | 364/403 |
| 5,128,861 | 7/1992 | Kagami et al. | 364/401 |

OTHER PUBLICATIONS

"The Effect of Commonality On Safety Stock In a Simple Inventory Model", Management Science vol. 32, No. 8, Aug. 1986 Baket et al.
"Component Commonality With Service Level Requirements" Management Science vol. 34, No. 6, Jun. 1988 by Y. Gerchak, Michael Magazine and Bruce Gamble.

Primary Examiner—Robert A. Weinhardt
Attorney, Agent, or Firm—Perman & Green

[57] ABSTRACT

Methods are described for predicting parts procurement requirements for products over a plurality of time periods, with certain of the parts being common to a plurality of products. The actual demand for the products is unknown, but the method assures that a specified service level is met for all products and minimizes expected excess part inventories. The methods are provided with inputs which, among others, includes lists of parts for each product, prices for the parts, and demand forecasts for each product in each time period, each forecast in the form of a mean and standard deviation. The description of the problem includes an objective function of minimizing expected excess inventory while satisfying the constraint that a specified service level be achieved. The problem is transformed into an unconstrained problem through the use of a Lagrange multiplier. The solution is achieved by performing a one parametric search on the value of the multiplier. The solution may achieve higher service levels than specified. Additional methods are described for improving the procurement decisions to more closely meet the service requirement.

7 Claims, 9 Drawing Sheets

SINGLE PERIOD ALGORITHM

INPUTS:

60 — A MEAN AND STANDARD DEVIATION FORECASTS FOR:
(1) $d'_{ci,t}$ = RANDOM DEMAND FOR EACH PART, ACCUMULATED UP TO $t_i$;
(2) $\bar{d}_{ci,t}$ = RANDOM DEMAND FOR EACH PART, ACCUMULATED UP TO PREVIOUS TIME PERIOD $t_{i-1}$ PLUS, FOR EACH PRODUCT THAT USES THE PART, THE DEMAND FOR THE CURRENT PERIOD MULTIPLIED BY SPECIFIED VOLUME FRACTION $y_{j,t}$ FOR THE CURRENT PERIOD, SUMMED OVER ALL PRODUCTS; AND
(3) $P_{ci}$ = PART PRICES FOR ALL PARTS;
(4) $X_t, Y_{j,t}$ = SERVICE LEVEL DESCRIPTORS

FOR EACH PART:

62 — (B.) FIND MINIMUM CUM. PROCUREMENT QUANTITY: COMPUTE CUM. PART PROCUREMENT VALUE $q'_{ci,t}$ SUCH THAT DEMAND DISTRIBUTION FUNCTION ($F_{\bar{D}ci,t}$), EVALUATED AT $q'_{ci,t}$, EQUALS SERVICE LEVEL $X_t$

FIG. 6

64 — C) FOR EACH PART:
DETERMINE VALUE OF LAGRANGE MULTIPLIER $\lambda_t$ FOR MINIMUM PROCUREMENT QUANTITY $q'_{ci,t}$
- USE PART PRICE, DISTRIBUTION FUNCTION $F_{D'ci,t}(q'_{ci,t})$ FROM INPUT A(1); DENSITY FUNCTION VALUE $f_{\bar{D}ci,t}(q'_{ci,t})$ FROM INPUT A(2), AND $F_{\bar{D}ci,t}(q'_{ci,t})$ FROM INPUT A(2) TO SOLVE:

$$P_{ci} F_{D'ci,t}(q^*_{ci,t}) - \lambda_t \frac{f_{\bar{D}ci,t}(q^*_{ci,t})}{F_{\bar{D}ci,t}(q^*_{ci,t})} = 0, \; \forall i \quad (6_t)$$

OVERALL PARTS:

66 — D(1) FIND MAX $\lambda$ VALUE AND SET EQUAL TO LOWER BOUND $\lambda_{L,t}$

68 — D(2) SET $\lambda_{u,t} = 100 \lambda_{L,t}$

FIND SERVICE PROBABILITY ACHIEVED BY $\lambda_{u,t}$:
FIND CUMULATIVE PROCUREMENT QUANTITY FOR EACH PART ($q'_{ci,t}$):

70 — E(1) INPUTS: $\lambda_{u,t}$ AND $P_{c,i}$
FIND VALUE OF f AND F FOR A SPECIFIC VALUE OF $q'_{ci,t}$ WHICH SATISFIES EQUATION $6_t$ FOR $\lambda_{u,t}$ VALUE.
START WITH LARGE $q'_{ci,t}$ VALUE AND THEN PERFORM SUCCESSIVE BISECTIONS OF INTERVAL

I) FIND IF SERVICE OVER ALL PARTS IS WITHIN TOLERANCE OF SPECIFIED SERVICE $X_t$
 - DETERMINE $\lambda_{M,t}$ WHICH IS MIDPOINT BETWEEN $\lambda_{u,t}$ & $\lambda_{L,t}$
 - USING $\lambda_{M,t}$, FOR EACH PART DETERMINE $q'_{ci,t}$ THAT SATISFIES EQUATION $6_t$
 - USING DETERMINED VALUES OF $q'_{ci,t}$, FIND OVERALL SERVICE VALUE AS IN STEP E
 - DETERMINE IF, FOR ALL PARTS, OVERALL SERVICE VALUE IS WITHIN SPECIFIED TOLERANCE

J) IF YES, GO TO STEP L

K) - IF SERVICE IS LESS THAN $X_t$, SET $\lambda_{L,t} = \lambda_{M,t}$ AND REPEAT STEP I
 - IF SERVICE IS GREATER THAN $X_t$, SET $\lambda_{u,t} = \lambda_{M,t}$ AND REPEAT STEP I L) RETURN $q'$ VALUES

FIG. 9
λ SCALING METHOD

- 100 — A) GENERATE A RANDOM DEMAND VALUE FOR EACH PRODUCT USING DEMAND DISTRIBUTION PARAMETER $\bar{d}_{pj,t}$

- 102 — B) FOR EACH PART, DETERMINE RANDOM DEMAND VALUE USING BILL OF MATERIALS AND PRODUCT RANDOM DEMAND VALUE TO OBTAIN $\bar{d}_{ci,t}$

- 104 — C) FOR EACH PART, DETERMINE $\lambda$ BY ASSIGNING VALUE $\bar{d}_{ci,t}$ TO $q'_{ci,t}$ IN EQUATION 6†

- 106 — D) FIND $\lambda_{max}$ ACROSS ALL PARTS & STORE IN A LIST

- 108 — E) REPEAT STEPS A-D TO ITER.$_{max.}$

- 110 — F) SORT $\lambda_{MAX}$ IN ASCENDING VALUE ORDER

- 112 — G) FIND A $\lambda'_{max}$ AT A PERCENTILE POSITION IN VALUE ORDER MOST CLOSELY CORRESPONDING TO VALUE OF SPECIFIED SERVICE LEVEL

- 114 — H) USING $\lambda'_{max}$ FIND CUMULATIVE PROCUREMENT VALUE $q'_{ci,t}$ FROM EQUATION 6†

FIG. 10
DIRECT SCALE METHOD

120 — A) INPUT $q'_{ci,t}$ VALUE FROM STEP L (FIG. 8)

122 — B) GENERATE A RANDOM PRODUCT DEMAND USING DEMAND DISTRIBUTION PARAMETER FOR $\bar{d}_{pj,t}$ 124 — C) FOR EACH PART, DETERMINE RANDOM DEMAND VALUE, USING BILL OF MATERIALS AND PRODUCT RANDOM DEMAND VALUE TO OBTAIN $\bar{d}_{ci,t}$ 126 — D) FIND SCALING FACTOR $S_{max}$ AS FOLLOWS
$$(S_{max})_{iter} = \max_i \left\{ \left( \frac{(\bar{d}_{ci,t})_{iter}}{q'_{ci,t}} \right) \right\}$$

128 — E) REPEAT STEPS B-D TO $ITER_{MAX}$.

130 — F) SORT $S_{MAX}$ VALUES IN ASCENDING ORDER

132 — G) FIND A VALUE OF $S_{MAX}$ AT A PERCENTILE POSITION IN VALUE ORDER MOST CLOSELY CORRESPONDING TO THE VALUE OF THE SPECIFIED SERVICE LEVEL

134 — H) MULTIPLY $S_{MAX}$ FOUND IN (G) BY $q'_{ci,t}$ AND RETURN NEW VALUE $q''_{ci,t}$

METHODS FOR PARTS PROCUREMENT QUANTITY DETERMINATION WHERE DEMAND IS UNCERTAIN FOR THE PRODUCT IN WHICH THE PARTS ARE USED

FIELD OF THE INVENTION

This invention relates to parts procurement planning under uncertain product demand circumstances, and more particularly, to an improved method for predicting parts requirements while minimizing excess parts inventories.

BACKGROUND OF THE INVENTION

Many of today's complex products require relatively short factory assembly times, but incorporate parts whose manufacture and acquisition require long lead times. Where the demand for a product is known, the manufacturing operation can be planned so that its parts are procured and arrive at the manufacturing facility at optimum times. By contrast, where parts are acquired according to forecasts, but assembly of the product is delayed until an order is received, solution to the parts procurement planning problem becomes more complex.

Some of the complexities are as follows. First, product forecasts (in which products the parts are to be incorporated) are to a great extent, educated guesses which are often expressed in probability terms, i.e. a mean value and a standard deviation. Second, parts to be incorporated in various products may be common to a plurality of products or usable with only one product. Third, consideration must be given to a "service" level to be achieved. service is defined as the probability that all product demands are met at least a specified percentage of the time. Fourth, inventory levels must be considered and, preferably, minimized so as to conserve required capital.

As above stated, a manufacturing system which requires a short assembly time but long component procurement lead times is often operated on an "assemble to order" basis. Examples of such manufacturing facilities are found in electronic assembly and test plants and in final "box" assembly plants. In printed circuit card assembly plants, the time to complete assembly and test is typically a week or two, while the time for procuring integrated circuits which are mounted on the cards is typically two to three months or more. In "box" assembly plants, assembly and test is typically on the order of several days, while some of the high technology subassemblies, such as disk drives, may have lead times of months or more.

Such manufacturing facilities are often operated in "just-in-time" or in a pull-driven manner. Such methods reduce the level of finished goods inventory required to respond to market demands. The critical factor in making such approaches successful is the ready availability of all parts that make up the product. Clearly, because of procurement lead times, it is not possible to obtain the parts when the demand for the product is actually known. Thus, procurement decisions have to be made long in advance. As a result, such procurement decisions are made based upon product forecasts.

The prior art contains a number of references which efficiently handle manufacturing and procurement scheduling where product demands are deterministically known. For instance, in U.S. Pat. No. 4,646,238 to Carlson, Jr. et al., a materials requirement planning method is described which is dependent upon prestored information relating to the demand and inventory of all product grades. The system enables the number of common components to be determined and adjusts the inventory to meet projected demands. In U.S. Pat. No. 4,459,663 to Bye, actual and planned customer orders are employed to control manufacture of end item products and components. In U.S. Pat. No. 4,887,206 to Natarajan, a cost analysis system employs an inventory model to evaluate work-in-process and assess cost impacts resulting from engineering change requests. Similar teachings can be found in U.S. Pat. No. 4,920,488 to Filley and 4,924,385 to Dote.

As above indicated, an objective in "assemble to order" environments is the minimization of investment in parts while assuring a required level of service across the products, even in an environment of uncertain product demand. Achievement of this objective is beyond the capabilities of current materials requirement planning systems, since such systems treat demand deterministically. Ad hoc procedures to deal with the problem using materials requirement planning systems usually result in excessive parts inventory.

The prior art has attempted to deal with such uncertain demand environments but has only done so with respect to simple product structures and/or part procurements limited to a single time period. Baker et al. in "The Effect of Commonality on Safety Stock, a Simple Inventory Model", Management Science, Vol. 32, Number 8, August 1986, considers two products whose demands are uniformly distributed, each product having a unique component and a common component, all having the same price and being used once in each product. Baker et al. show that the introduction of commonality reduces the total inventory required to meet a specified service level and to provide an optimal solution. Beyond two products and uniform distributions, however, the Baker et al. method is not applicable.

Gerchak et al. extended the Baker et al. work in "Component Commonality With Service Level Requirements", Management Science, Vol. 34, Number 6, June 1988. Gerchak et al. consider arbitrary numbers of products, however all have only one unique component and share one common component. Only a single time period is considered. No method is given for solving this expanded problem as well as for a more complex problem where pluralities of parts are distributed among pluralities of products, some parts being common to a plurality of such products.

Accordingly, it is an object of this invention to provide an improved method for parts procurement in an "assemble-to-order" environment.

It is another object of this invention to provide an improved procurement method which accommodates unknown random product requirements.

It is still another object of this invention to provide an improved parts procurement method which assures that a specified service level is achieved while maintaining a minimum excess parts inventory.

SUMMARY OF THE INVENTION

Methods are described for predicting parts procurement requirements for products over a plurality of time periods, with certain of the parts being common to a plurality of products. The actual demand for the products is unknown, but the method assures that a specified service level is met for all products and minimizes expected excess part inventories. The methods are provided with inputs which, among others, includes lists of parts for each product, prices for the parts, and demand forecasts for each product in each time period, each forecast in the form of a mean and standard deviation. The description of the problem includes an objective function of minimizing expected excess inventory while satisfying the constraint that a specified service level be achieved. The problem is transformed into an unconstrained problem through the use of a Lagrange multiplier. The solution is achieved by performing a one parametric search on the value of the multiplier. The solution may achieve higher service levels than specified. Additional methods are described for improving the procurement decisions to more closely meet the service requirement.

DETAILED DESCRIPTION OF THE INVENTION

Figure 1:
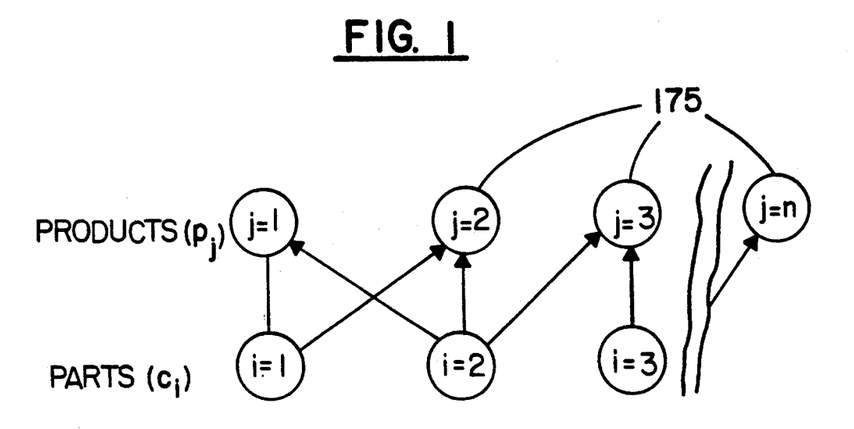
FIG. 1 is a schematic showing the relationship of products and parts incorporated therein.

Referring now to FIG. 1, a plurality of products $p_j$ is to be produced, however, the actual demand therefor is unknown. A plurality of parts $c_i$ are incorporated in products $p_j$, certain of the parts being incorporated in a plurality of products. The invention assures that there is a sufficient parts inventory to enable a specified service level to be achieved in any time period while, at the same time, minimizing expected excess parts inventory. As above stated, service level achieved in a time period t is the probability that, for all products, a specified volume fraction of the demand for each product in period t is met, plus the unsatisfied demand for that product in previous periods is also met. That probability is expressed as a number between 0 and 1. It is also assumed that product demands are independent of each other (whereas part demand may or may not be independent).

As is usual in such production systems, a forecast is provided to the production planner giving a requirement forecasts for each product. Each requirement forecast is cast in the form of a mean and standard deviation for the product.

Figure 2:
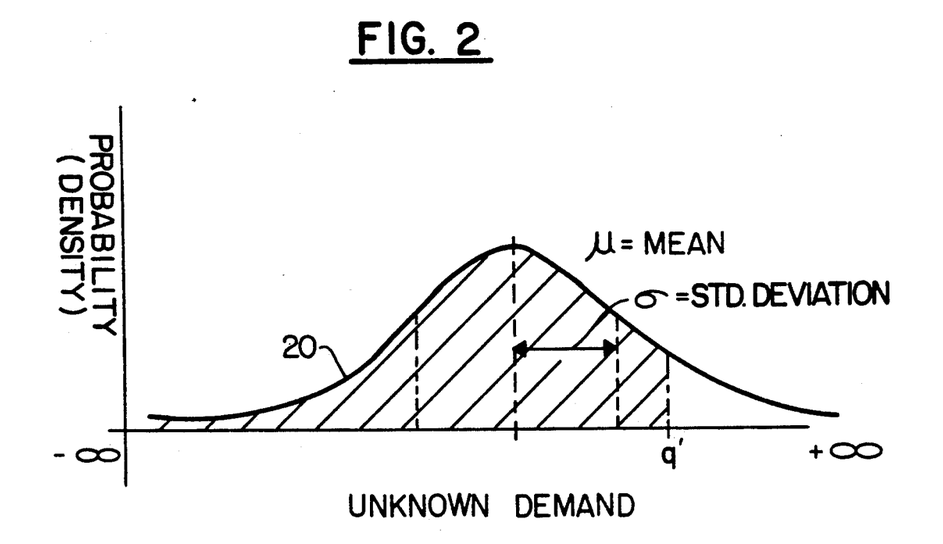
FIG. 2 is a plot of unknown demand of a product versus probability that any one demand will be achieved (i.e, a density function).

Referring to FIG. 2, a plot of unknown demand versus probability is shown and, for example, a normal distribution curve 20 is illustrated. Curve 20 is also known as a density function and is derived from the mean and standard deviation forecast for the product. As is known to those skilled in the art, the area under curve 20 is equal to 1.

The density function shown in FIG. 2 enables a demand distribution function to be determined for the product. A demand distribution function, for any given point on the demand axis, is the probability that the actual demand will be less than or equal to the value at the given point on the demand axis. Thus, given a quantity $q'$, the demand distribution function is equal to the area shown cross-hatched beneath curve 20 and can be expressed as a percentage of the area under curve 20 or, depending upon the position of $q'$, as a number between 0 and 1. In essence, the demand distribution function is an integration of the density function up to the given quantity point $q'$ on the demand axis.

Hereinafter, the term "time period" will be employed as referring to a period over which a density function and a demand distribution function will be evaluated for all demand for the product, accumulated up to the end of the current time period. Each time period may include one time increment or a plurality of time increments, as the case may be. In other words,, the term time period is "cumulative" and includes all previous time increments up to and through a current time increment being considered. Thus, with the passage of time, each time period increases accordingly and incorporates additional time increments. This is an important aspect of the invention as it enables solutions to be obtained for succeeding time periods and those solutions to be subtracted, one from the other, to obtain difference values which precisely apply to each time increment making up a time period.

Before continuing, the following are terminology definitions which will be sued herein.

TERMINOLOGY nj total number of products
ni total number of parts
nt total number of time periods for which planning is done. All the planning is done before time period 1. Therefore, at the time of part procurement planning not of the actual product demands are known. Only forecasts of product demands are known.
$u_{ij}$ usage count of part i in product j.
$d_{pj,t}$ unknown random demand for product j in period t; this demand becomes known only in period t
$d'_{pj,t}$ unknown random cumulative demand for product j upto period t, $$\sum_{\tau=1}^{t} d_{pj,\tau}$$

$y_{j,t}$ service volume fraction for product j in period t, i.e., this is the fraction of the actual demand for product j in period t that is to be satisfied in period t along with the backlog from the previous periods
$\overline{d}_{pj,t}$ equal to $$\sum_{\tau=1}^{t-1} d_{pj,\tau} + y_{j,t} d_{pj,t}.$$

This is the sum of the unknown random cumulative demand for product j up to period $t-1$ and $y_{j,t}$ times the unknown random demand for product j for period t.
$d_{ci,t}$ unknown random demand for part i in period t, $$\sum_j u_{i,j} d_{pj,t}$$

$d'_{ci,t}$ unknown random cumulative demand for part i upto period $$t, \sum_j u_{i,j} d'_{pj,t}$$

$\bar{d}_{ci,t}$ unknown random cumulative demand for part i upto period t obtained from $\bar{d}_{pj,t}$, $$\sum_j u_{i,j}(d'_{pj,t-1} + y_{j,t}d_{pj,t})$$

$q_{ci,t}$ part i supply in the beginning of period t available for consumption in period t $X_t$ required service level (probability) in period t $P_{ci}$ cost of part i $f_{\bar{D}pj,t}(\bar{d}_{pj,t})$ probability density function of the random variable; for a continuous density function, such as for example Normal density function, this is a curve with the X-axis representing the random variable and the Y-axis representing the density. $\bar{d}_{pj,t}$ $F_{\bar{D}pj,t}(\bar{d}_{pj,t})$ cumulative distribution function of the random variable; for a continuous cumulative distribution function, such as for example Normal distribution function, this is a curve with the X-axis representing the random variable and the Y-axis representing the probability or the area under the density curve. $\bar{d}_{pj,t}$ $f_{D'pj,t}(d'_{pj,t})$ density function of the random variable $d'_{pj,t}$ $F_{D'pj,t}(d'_{pj,t})$ cumulative distribution function of the random variable $d'_{pj,t}$ $f_{\bar{D}ci,t}(\bar{d}_{ci,t})$ density function of the random variable $\bar{d}'_{ci,t}$ $F_{\bar{D}ci,t}(\bar{d}_{ci},t)$ cumulative distribution function of the random variable $\bar{d}'_{ci,t}$ $f_{D'ci,t}(d'_{ci,t})$ density function of the random variable $d'_{ci,t}$ $F_{D'ci,t}(d'_{ci,t})$ cumulative distribution function of the random variable $d'_{ci,t}$ $\mu_Z$ mean of random variable Z, where Z can be $D_{pj,t}$, $D'_{pj,t}$, $\bar{D}_{pj,t}$, $D_{ci,t}$, $D'_{ci,t}$ or $\bar{D}_{ci,t}$.

$\sigma_Z$ standard deviation of random variable Z, where Z can be $D_{pj,t}$, $D'_{pj,t}$, $\bar{D}_{pj,t}$, $D_{ci,t}$, $D'_{ci,t}$ or $\bar{D}_{ci,t}$.

$q'_{ci,t}$ cumulative procurement of part i upto period t, $$\sum_{\tau=1}^{t} q_{ci,\tau}$$

i for all i, i.e., i=1,2, ...

* means at optimality $\lambda_t$ is the Lagrange Multiplier for time period t.

Mathematically, the problem can be stated as in equations 1 and 2 below.

$$\underset{q'_{ci,t}}{\text{Minimize}} \; E\left[\sum_t \sum_i (q'_{ci,t} - d'_{ci,t})^+ P_{ci}\right] \quad [1]$$

$$Pr\{q'_{ci,t} \geq \bar{d}_{ci,t}, \forall i\} \geq X_t, \forall t \quad [2]$$

Equation 1 states that for any time period t, the positive difference between the cumulative procurement of parts up through cumulative time period t, less the demand for such parts through cumulative period t multiplied by the price of such parts, is minimized. Equation 2 indicates that the probability that, over all parts, the cumulative procurement of any part in a time period t is greater than or equal to the sum of the demand for the part up to, but not including the current time increment, added to the demand for the part in the current time increment times a volume fraction, is greater than or equal to the specified level of service, over all time periods. Equations 1 and 2, when solved, minimize the expected value of parts inventory in excess of part demand, subject to service level requirements.

The problem stated in equations 1 and 2 is separable into several different sub-problems, one for each cumulative time period t, as follows:

$$\underset{q'_{ci,t}}{\text{Minimize}} \; E\left[\sum_i (q'_{ci,t} - d'_{ci,t})^+ P_{ci}\right] \quad [1_t]$$

$$Pr\{q'_{ci,t} \geq \bar{d}_{ci,t}, \forall i\} \geq X_t \quad [2_t]$$

The difficulty presented by equation $2_t$ is that it expresses a joint probability of the unknown demands for all parts, each of which is not an independent variable. In other words, because certain parts are used in more than one product, the demands therefor are not independent. As a result, solutions to equation $2_t$ are difficult to evaluate. Three methods that provide feasible solutions to the above problem are presented. The first method provides a solution that may achieve a service level greater than specified. The second and third methods improve the solution of the first method.

Because the demands for parts are "associated", mathematical theory indicates that rather than evaluating a "joint probability" as indicated in equation $2_t$, the product of individual part demand probabilities can be employed, such products providing a more conservative, but easier to find solution to the problem. The product of probabilities is $$\prod_i Pr\{q'_{ci,t} \geq \bar{d}_{ci,t}\}$$

Since mathematical theory indicates that the relationship shown in equation $3_t$ below is true, than the constraint shown in expression $4_t$ can be substituted for equation $2_t$ in the original problem.

$$\prod_i Pr\{q'_{ci,t} \geq \bar{d}_{ci,t}\} - X_t \geq 0 \quad [3_t]$$

$$Pr\{q'_{ci,t} \geq \bar{d}_{ci,t}, \forall i\} \geq \prod_i Pr\{q'_{ci,t} \geq \bar{d}_{ci,t}\} \quad [4_t]$$

Since the natural log (Ln) is a monotone function, the Ln transformed form of equation $4_t$ is used. Therefore, the problem to be solved is represented by equations $1_t$ and a Ln-transformed version of equation $4_t$. An optimum solution to the problem expressed above can be found by transforming the constrained problem (where the constraint is that the service level be maintained) into an unconstrained problem through the technique of Lagrange multipliers. The Lagrange function for equations $1_t$ and Ln of $4_t$ is given by equation 5.

$$L = E\left[\sum_i (q'_{ci,t} - d'_{ci,t})^+ P_{ci}\right] + \lambda_t \times \left(\ln X_t - \sum_i \ln F_{\bar{D}ci,t}(q'_{ci,t})\right)$$

Equation 5 has two additive terms. The first term is the objective function and defines the difference between cumulative procurement of parts for time period t, less cumulative demand for parts through time period t, times the price of the part, thus giving expected excess inventory. The second term is the product of the Lagrange multiplier ($\lambda_t$) and the deviation from the specified service level $X_t$ of the actual service achieved by procurement quantities $q'_{ci,t}$. In other words, the value of the second term is a "penalty" for not satisfying the desired service level. $\lambda$'s value is thus determined by the difference between the specified service level and the achieved service level.

The optimum procurement quantities for the Lagrangean function in equation 5 are obtained by solving Kuhn-Tucker conditions for optimality given below:

$$P_{ci}F_{D'ci,t}(q'_{ci,t}{}^*) - \lambda_t^* \frac{f_{\bar{D}ci,t}(q'_{ci,t}{}^*)}{F_{\bar{D}ci,t}(q'_{ci,t}{}^*)} = 0, \forall i \quad [6_t]$$

$$\lambda_t^* \left( \sum_i \ln F_{\bar{D}ci,t}(q'_{ci,t}{}^*) - \ln X_t \right) = 0 \quad [7_t]$$

$$\lambda_t^* > 0 \quad [8_t]$$

A general mathematical principle used in obtaining the minimum value of a function is to obtain the derivative of the function with respect to the decision variable and to solve for the value of the decision variable by setting the derivative equal to zero. This general principle is employed in obtaining the Kuhn-Tucker conditions from the Lagrangean function. However, it should be noted that the Kuhn-Tucker conditions are only necessary conditions in general, but in the case of normal distributions they are also sufficient conditions. Detailed description of the Kuhn-Tucker conditions can be found in: Mordecai Avriel, "Nonlinear Programming and Analysis and Methods", Prentice-Hall, 1976, page 41. Hereinafter, the overall method of the invention will be described with respect to the flow diagram of FIGS. 3 and 4 and, subsequently, the single period method will be described with respect to the flow diagram shown in FIGS. 5-8.

Figure 3:
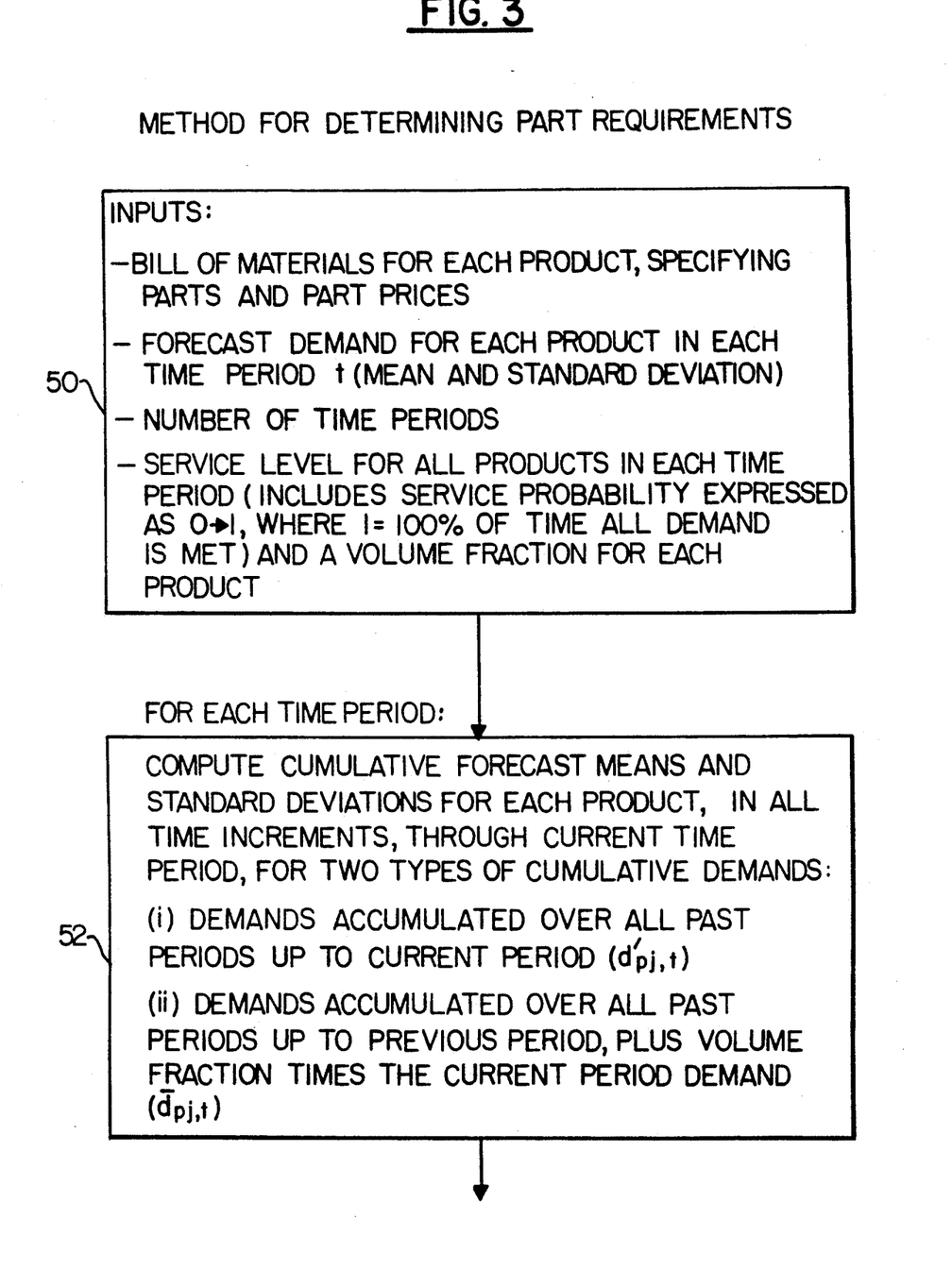
FIGS. 3 and 4 illustrate a high level flow diagram describing the overall method of the invention.

Referring first to FIG. 3, box 50 designates the data inputs required for an optimum cumulative parts requirement determination. The inputs are as follows: a bill of materials for each product specifying the parts that are included in each product and the parts prices; a forecast demand for each product in each time period t, expressed as a mean and standard deviation. Further inputs include the number of time periods being considered; a specified service level required for all products; and a volume fraction for each product (being the fraction of the current period demand for the product that is to be satisfied).

Under most circumstances, a specified service level will be a number less than 1. As a result, at the end of each time period, there may be an unfulfilled demand for products. Thus, in the solution for each succeeding time period, an unfulfilled demand for the previous time period must be satisfied in addition to the demand for the additional time increment of the next time period. It will be seen that by employing cumulative time period solutions and subsequently subtracting succeeding time period solutions from each other, that unfulfilled demand from a prior time period is automatically handled.

The method of the invention commences as shown in box 52 and, for each time period, computes from the input forecasts, cumulative mean and standard deviation values of the demand for each product in all time increments through the current time period (box 52). Two types of cumulative demands are computed: (i) demands accumulated over all past periods up to current period ($d'_{pj,t}$); and (ii) demands accumulated over all past periods up to previous period, plus volume fraction times the current period demand ($\bar{d}_{pj,t}$). Then, using the product bills of materials and cumulative product demand results from box 52, cumulative requirements (expressed as a mean and standard deviation) are computed for each part in all time increments through the current time period for $d'_{ci,t}$ and $\bar{d}_{ci,t}$.

Next, (See FIG. 4, box 55) the method proceeds to consider each cumulative time period t. The method invokes a single period algorithm which finds the part procurement value required to satisfy cumulative product demand for time period t, within constraints of a specified service level and a minimum expected excess inventory level.

Figure 4:
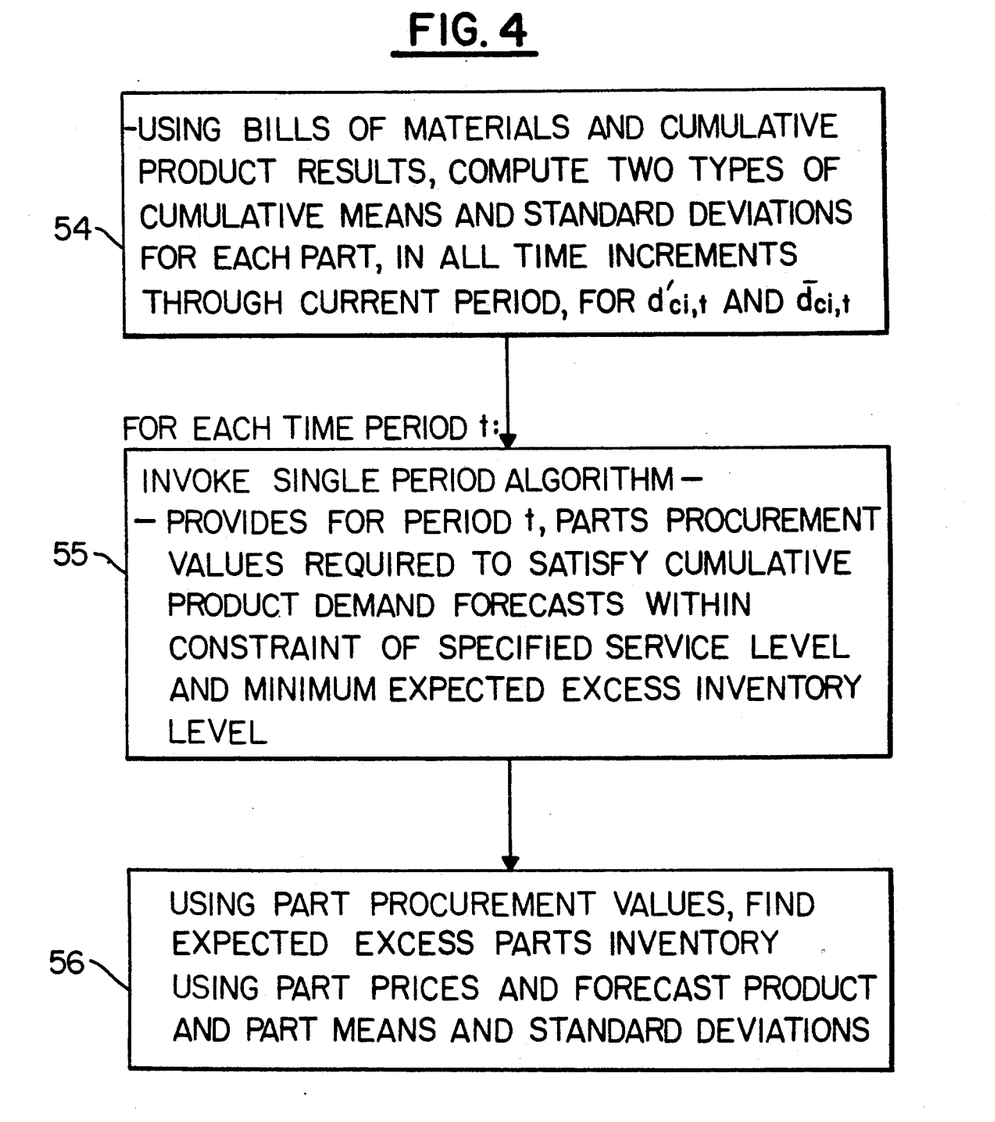

Once the part procurement values are determined for time period t (see box 56), the expected excess parts inventory is found using the following expression:

$$\sum_t \sum_i ((q'_{ci,t} - \mu_{D'ci,t}) F_{D'ci,t}(q'_{ci,t}) + \sigma^2_{D'ci,t} f_{D'ci,t}(q'_{ci,t})) P_{ci}$$

The above expression is obtained from the objective function in equation 1, by evaluating the expectation E through integration.

Figure 5:
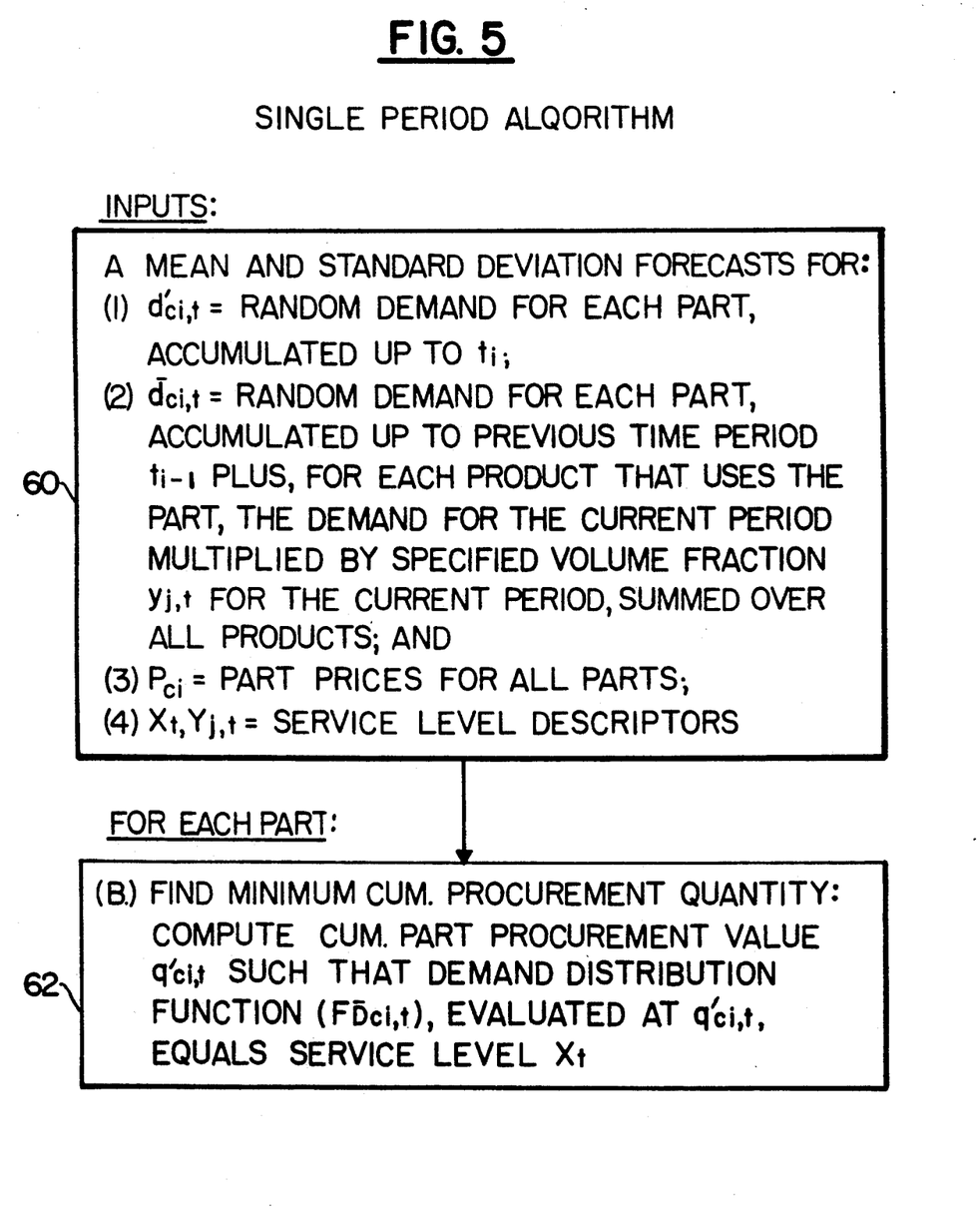
FIGS. 5-8 illustrate a high level flow diagram of the method of the invention, as applied to a single time period, each time period being a cumulative and incorporating all previous time periods under consideration.

Turning to FIG. 5, the method indicated in box 55 of FIG. 4 will be further described. The single period algorithm requires as its inputs those functions shown in box 60. They include: mean and standard deviation values for the accumulated random demand for each part through time period t; the random demand for each part, accumulated up to previous time period t−1, summed with the parts demand for the current time increment, multiplied by a specified volume fraction for the current time increment, summed over all products which use the part. Additional inputs include part prices for all parts and service level descriptors $X_t$ (over all products for a time period t) any $y_{j,t}$ (for product j in time period t).

The single period method starts at Step B, considering each part and finding for that part a minimum cumulative procurement quantity for time period t. That function is derived as shown in box 62 by computing a cumulative procurement value that enables the cumulative demand distribution function $F_{Dci,t}$, when evaluated at $q'_{ci,t}$, to equal specified service level $X_t$. This can be thought of as finding a procurement value for a part which defines an area under the density curve (a number between 0 and 1) that equals the service level $X_t$ (also expressed as a number between 0 and 1).

Figure 6:
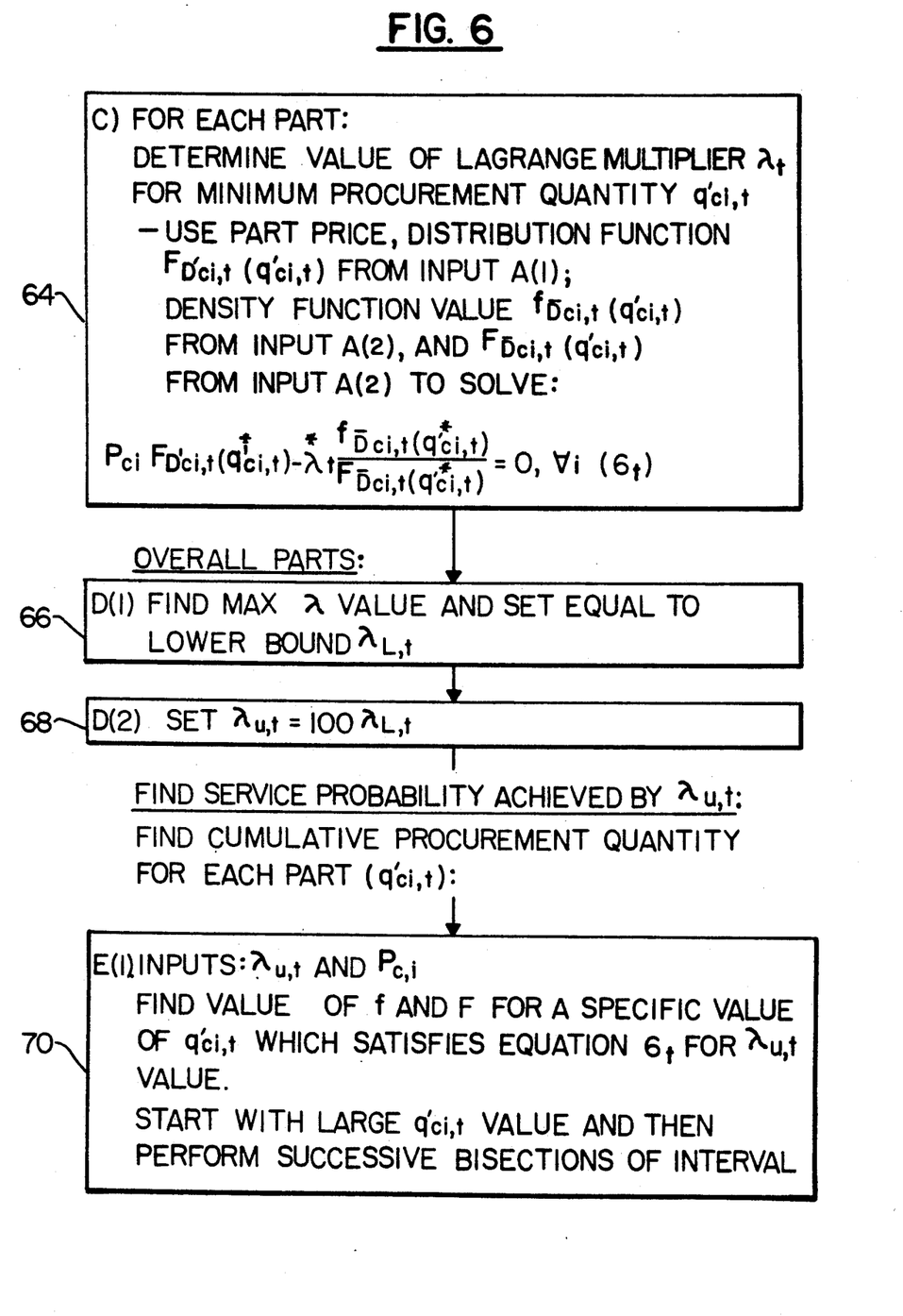

The method proceeds to step C (box 64) and determines the value of a Lagrange multiplier $\lambda_t$ for the minimum procurement quantity $q'_{ci,t}$ for each part. Equation $6_t$ is employed and uses as its inputs: the part's price; a distribution function value derived from input A(1) (Box 60), and a density function value derived from input A(2) (box 60) and a distribution function value derived from input A(2). A value for Lagrange multiplier $\lambda_t$ is thereby determined for the minimum procurement quantity $q'_{ci,t}$ for each part, in time period $t_i$.

Next, the maximum Lagrange multiplier value over all parts found as a result of Step C is determined and is set as a lower bound $\lambda_{L,t}$ multiplier (box 66). An arbitrary upper bound is then determined (box 68) by increasing the lower bound $\lambda_{L,t}$ by a multiplier (e.g. 100) to obtain an upper bound Lagrange multiplier $\lambda_{u,t}$ (Box 60).

At this point, the method determines the service probability that will be achieved by the substitution of upper bound Lagrange multiplier $\lambda_{u,t}$. This is determined in step E1 by first finding the cumulative procurement quantity $q'_{ci,t}$ for each part. To accomplish this determination, the price $P_{c,i}$ of the part and the value $\lambda_{u,t}$ are substituted in equation $6_t$. Values of density function $f_{\bar{D}ci,t}$ and distribution functions $F_{\bar{D}ci,t}$ and $F_{D'ci,t}$ are found for a specific cumulative procurement quantity $q'_{ci,t}$. The solution results by starting with a large value of cumulative procurement quantity $q'_{ci,t}$, and then performing successive bisections of the interval until a solution is approximated.

Figure 7:
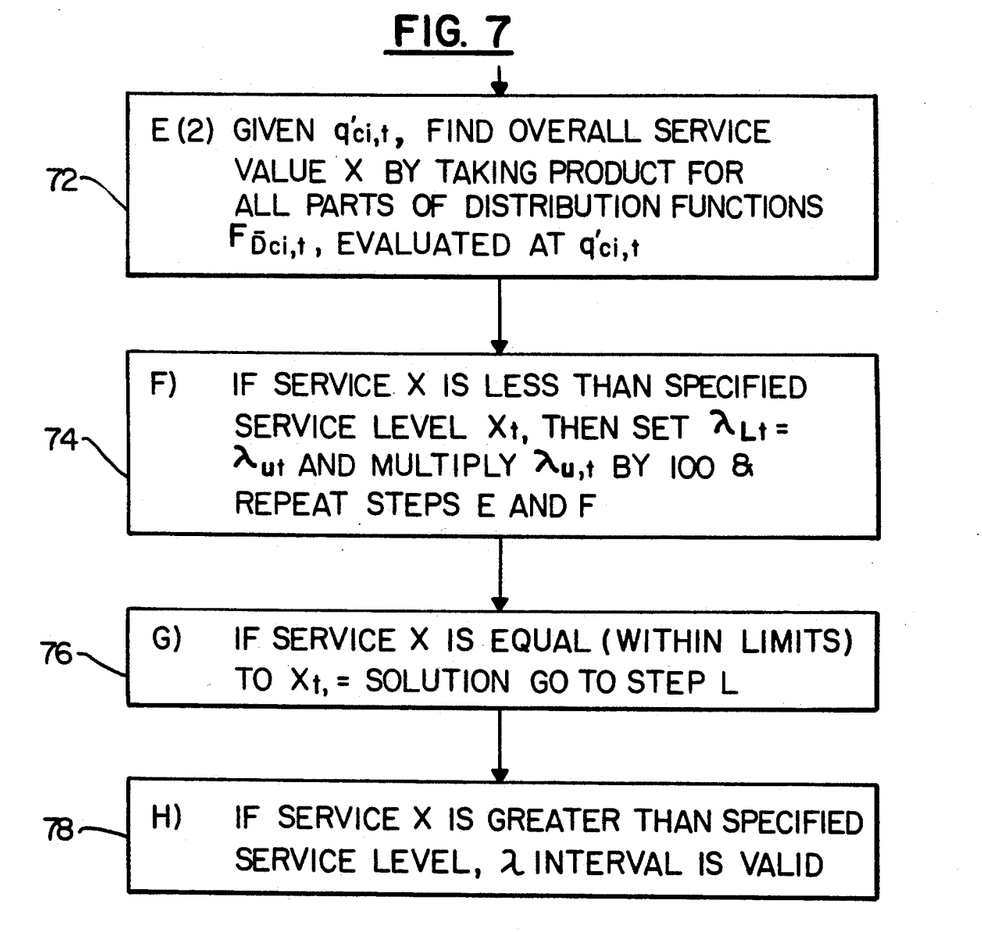

Given a solution $q'_{ci,t}$ for each part, the corresponding overall service value X is found in Step E(2) by taking the product, for all parts, of each part's distribution function $F_{\bar{D}ci,t}$, evaluated at the found cumulative procurement quantity $q'_{ci,t}$ (box 72).

If the service value X, as determined in Step E(2), is less than the specified service level $X_t$, then it is known that the range between the maximum Lagrange multiplier $\lambda_{u,t}$ and the lower value $\lambda_{L,t}$ is incorrect. In such case, the range is increased by setting $\lambda_{L,t} = \lambda_{u,t}$ and multiplying $\lambda_{u,t}$ by 100 and repeating steps E and F (box 74).

Figure 8:
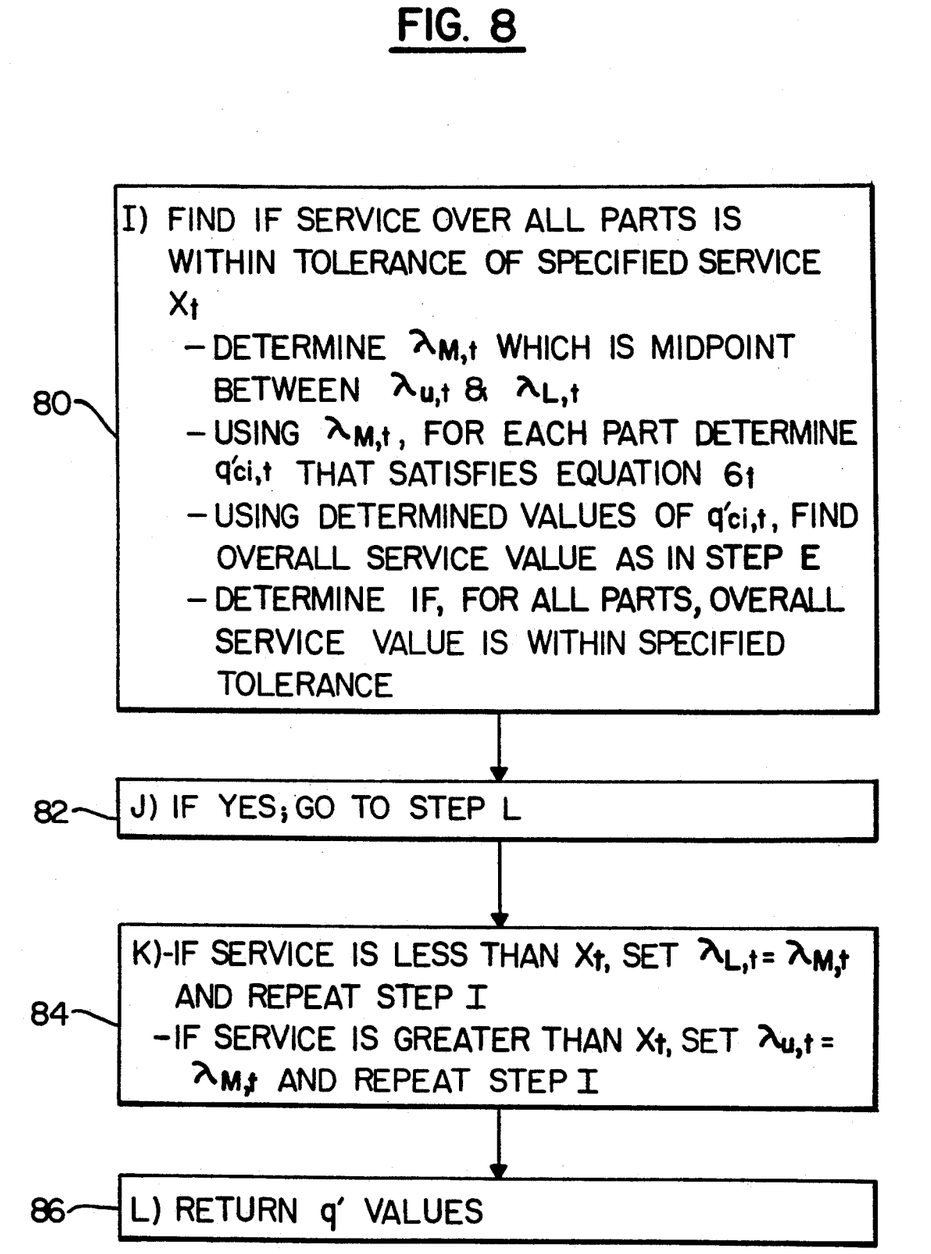

If the service value X is equal (within limits) to the specified service level $X_t$, then a solution has been found (box 76) and the procedure moves to step L (box 86, FIG. 8). If the determined service level X is greater than the specified service level $X_t$, then the Lagrange multiplier interval (i.e. $\lambda_{L,t} - \lambda_{u,t}$) is valid and the procedure moves to Step I (box 80) in FIG. 8.

It is now necessary to find the value of $\lambda$ with the interval ($\lambda_{L,t} - \lambda_{u,t}$) for which the service level achieved is equal to $X_t$ (within the specified tolerance). The overall service level is found in Step I (Box 80) by finding the mid point between the $\lambda_{u,t}$ and $\lambda_{l,t}$ and designating it as $\lambda_{m,t}$. Then, for each part, a new cumulative procurement quantity $q'_{ci,t}$ is found that satisfies equation $6_t$ (box 64). Using the resultant values of $q'_{ci,t}$, the corresponding overall service value X is found as indicated in Step E. If the overall service value found is within the specified limits given for $X_t$ then the method returns the procurement values $q'_{ci,t}$ (box 86) to the main procedure (Boxes 82, 86). If not, and the service value is found to be either less than or greater than the desired service level range $X_t$, then the Lagrange multiplier values are adjusted as shown in box 84, and Step I is repeated.

Returning to FIG. 3 (box 55), the returned cumulative procurement values for the time period are then used to compute the expected excess inventory and the procedure is at an end.

As will be recalled, the values derived from Step L in FIG. 8 provide a service value equal to or greater than that which is actually required. The procedures shown in FIGS. 9 and 10 enable the cumulative part procurement value to be scaled so as to achieve a service value closer to specified service value $X_t$.

Figure 9:
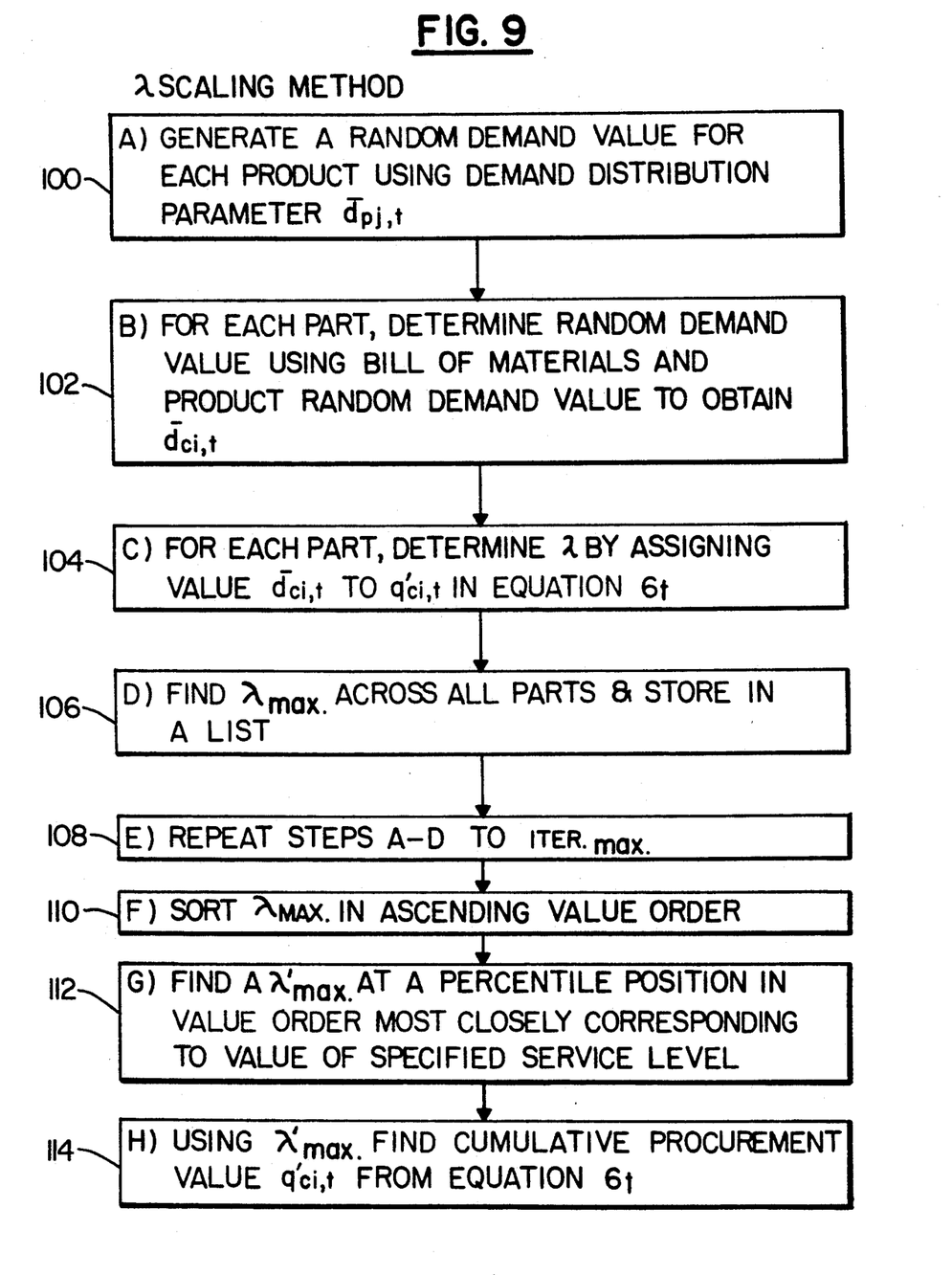
FIG. 9 illustrates an alternative solution method to that shown in FIGS. 5-8.

Referring now to FIG. 9, an embodiment of the invention (termed: $\lambda$ scaling method) is described which employs an iterative method yielding an improved solution to the original problem represented by equations $1_t$ and $2_t$. The procedure commences by initially generating a random demand value for each product using a demand distribution parameter $\bar{d}_{pj,t}$ determined as described above (box 100). Then, for each part (box 102), a part random demand value $\lambda_{ci,t}$ is determined using the bills of materials and the product random demand values determined in box 100.

For each part (box 104), a Lagrange multiplier $\lambda$ value is then found in equation $6_t$ by assigning therein the value $\bar{d}_{ci,t}$ to $q'_{ci,t}$. Once the values of $\lambda$ have been found across all parts, the maximum $\lambda$ value is determined and stored in a list (box 106). At this point, steps A-D (boxes 100-106) are repeated a number of times to a maximum reiteration number (box 108). All of the found Lagrange multipliers are then sorted in ascending value order (box 110). The Lagrange multiplier $\lambda$ value at the percentile position most closely corresponding to the service value $X_t$ is picked and using that value, equation $6_t$ is solved to find the resulting cumulative procurement value $q''_{ci,t}$ (box 114).

Figure 10:
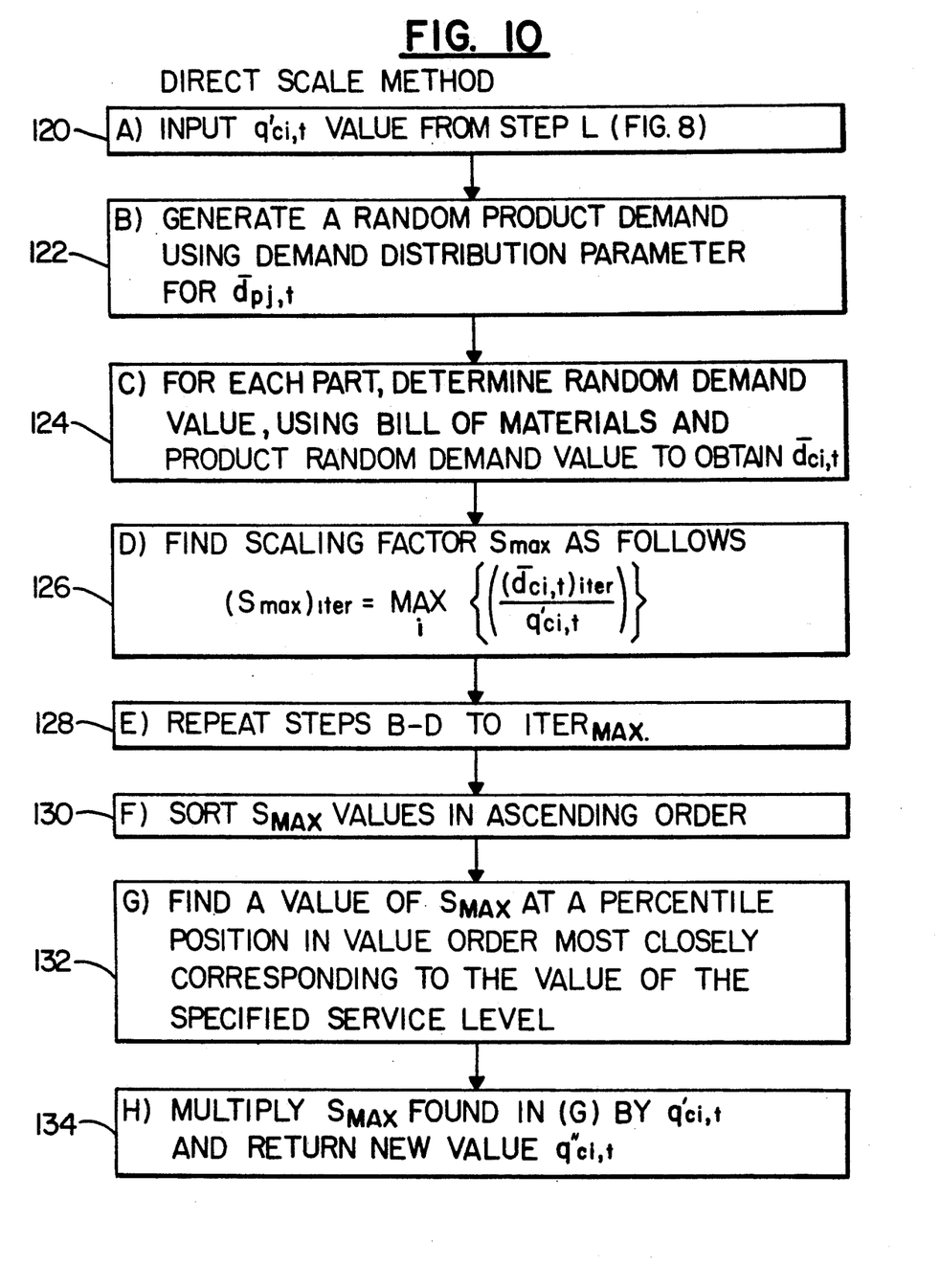
FIG. 10 is still another alternative solution method for the invention.

Still another embodiment of the method is shown in FIG. 10 that derives an improved cumulative part procurement value by scaling the cumulative procurement values derived from step L in FIG. 8. The procedure shown in FIG. 10 is, as in FIG. 9, an iterative procedure. It uses as an input the $q'_{ci,t}$ value from Step L in FIG. 8 (box 120). A random product demand for each product using the demand distribution parameter for $\bar{d}_{pj,t}$ (box 122). The product demand number is then employed to obtain a part demand value $\bar{d}_{ci,t}$ (box 124) and a scaling factor $S_{max}$ is determined using the expression shown in box 126. Additional values of $S_{max}$ are then found by repeating the procedure shown in Steps B-D to a maximum iteration number (box 128). The thus-found values of $S_{max}$ are then sorted in a list (box 130). The value of $S_{max}$ at the percentile position in the list that most closely corresponds to the service level $X_t$ is then selected and used as a multiplier to modify the value of $q'_{ci,t}$ to return a new value of $q''_{ci,t}$. As a result, a cumulative part procurement value is returned which more closely provides the required service level at a lower expected excess inventory.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A stochastic method for determining, over a series of time periods, parts procurement requirements for products, certain said parts used in a plurality of products, wherein actual demand for said products is unknown, said method adapted to meet a specified service level for all products and to minimize expected excess part inventories, the method having inputs comprising, lists of parts for each said product, prices for said parts, and forecasts of demands for each said product in each time period, the method comprising computer implemented steps of:

a. deriving a first cumulative demand $D'_{ci,t}$ for each part $c_i$ through a current time period t, and a second cumulative demand $\bar{D}_{ci,t}$ for each part $c_i$ through a time period $t-1$, added to the demand for each part in current time period t, modified by a specified volume fraction of actual demand for each part in period t that is to be satisfied in period t, each cumulative demand expressed by a mean and standard deviation;

b. determining a minimum cumulative procurement quantity $q'^*_{ci,t}$ for each part through time period t that meets said specified service level, from a demand distribution function $F_{\overline{D}ci,t}$ from said second cumulative demand;

c. finding a factor ($\lambda$), for each part, at said determined minimum cumulative procurement quantity, that satisfies equation $6_t$:

$$P_{ci}F_{D'ci,t}(q'^*_{ci,t}) - \lambda^* \frac{f_{\overline{D}ci,t}(q'^*_{ci,t})}{F_{\overline{D}ci,t}(q'^*_{ci,t})} = 0, \forall i; \qquad [6_t]$$

where:

$c_i$ is part i,
$P_{ci}$ is the cost of part i,
t is the time period,
$q'_{ci,t}$ is the cumulative procurement of part i up to period t,
$F_{\overline{D}ci,t}(q'_{ci,t})$ is the cumulative distribution function of the random variable $q'_{ci,t}$,
* means, at optimality,
$\lambda_t$ is the LaGrange Multiplier for time period t,
$f_{\overline{D}ci,t}(q'_{ci,t})$ is the density function of the random variable $q'_{ci,t}$,
$F_{Dci,t}(q'_{ci,t})$ is the cumulative distribution function of the random variable $q'_{ci,t}$,
$\forall i$ means for all i, i.e., i=1,2, ...

d. employing a maximum value factor ($\lambda$) found in step c to derive for each part, a new cumulative procurement quantity from equation $6_t$ over all time periods through t, and based thereon, an overall service level for each part, said overall service level for each part determined by taking the product of cumulative demand distribution functions for all parts, as determined from said second cumulative demands, evaluated at said new cumulative procurement quantity;

e. finding if said new cumulative procurement quantities for all parts provide a service level equal to said specified service level, and, if not, revising said factor ($\lambda$), and repeating steps d and e employing the revised factor ($\lambda$) until said specified service level is achieved; and f. employing resultant procurement quantities that enable achievement of the service level for acquisition of said parts.

2. The method as recited in claim 1, including the
g. using said found new cumulative procurement quantities and product forecasts to determine expected excess parts inventories.

3. The method as recited in claim 2, wherein step e, said revision of factor ($\lambda$) is determined by assigning a higher value to ($\lambda$) and searching to find a value for $\lambda$ within the assigned range of values of $\lambda$, which value meets said specified service level.

4. The method as recited in claim 3, further comprising the step of:

h. deriving a scaling factor by finding random demand values for said products and parts and determining a ratio between a said part random demand value and said new cumulative part procurement quantity; and i. modifying said new cumulative part procurement quantity by said scaling factor.

5. The method as recited in claim 4 wherein step h iteratively derives an ordered list of scaling factors and chooses one said scaling factor at a percentile position in said list that most closely corresponds to said specified service level, and employs said determined scaling factor in step g to find expected excess parts inventories.

6. A stochastic method for predicting, over a series of time periods, parts procurement requirements for products, certain said parts used in a plurality of products, wherein actual demand for said products is unknown, said method adapted to meet a specified service level for all products and to minimize expected excess part inventories, the method employing lists of parts for each said product, prices for said parts, and probability forecasts of demands for each said product in each time period, the method comprising the machine implemented steps of:

a. for each part, determining a random demand value from product bills of materials and product random demand values;

b. finding a value of $\lambda$ from equation $6_t$ by substituting therein, said part random demand value in place of $q'_{ci,t}$.

$$P_{ci}F_{D'ci,t}(q'^*_{ci,t}) - \lambda^* \frac{f_{\overline{D}ci,t}(q'^*_{ci,t})}{F_{\overline{D}ci,t}(q'^*_{ci,t})} = 0, \forall i; \qquad [6_t]$$

where:

$c_i$ is part i,
$P_{ci}$ is the cost of part i,
t is the time period,
$q'_{ci,t}$ is the cumulative procurement of part i up to period t,
$F_{\overline{D}ci,t}(q'_{ci,t})$ is the cumulative distribution function of the random variable $q'_{ci,t}$,
* means, at optimality,
$\lambda_t$ is the LaGrange Multiplier for time period t,
$f_{\overline{D}ci,t}(q'_{ci,t})$ is the density function of the random variable $q'_{ci,t}$,
$F_{Dci,t}(q'_{ci,t})$ is the cumulative distribution function of the random variable $q'_{ci,t}$,
$\forall i$ means for all i, i.e., i=1,2, ...

c. In all parts, finding $\lambda$ max values and placing said values in an ordered list;

d. repeating steps a-c and after n iterations selecting a value of $\lambda$ max at a percentile position in said list that corresponds to said specified service value; and e. employing said selected $\lambda$ max and equation $6_t$ to find a new value of $q'_{ci,t}$.

7. The stochastic method of claim 6, wherein step (d) sorts said values of $\lambda$ max by increasing value.

* * * * *